May 12, 1970     W. E. SWARTZ ETAL     3,511,669
METHOD OF MAKING A SAUSAGE PRODUCT
Filed July 27, 1966
Fig. 1.
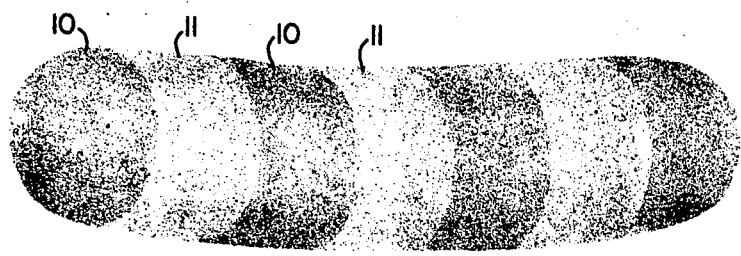
Fig. 2.
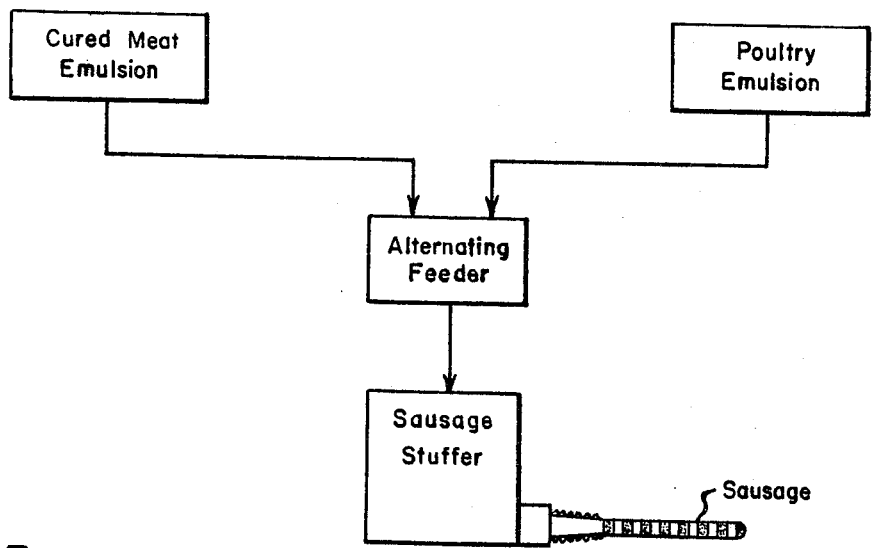
Fig. 3.
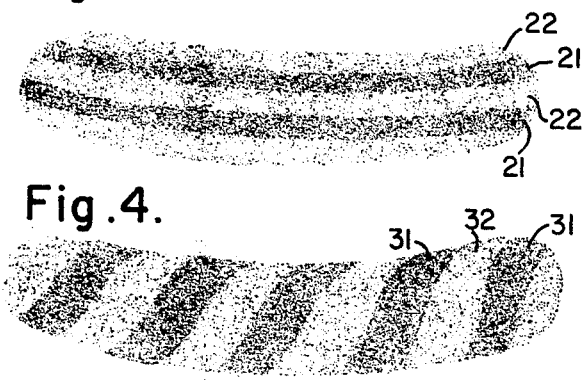
Fig. 4.
INVENTORS
William E. Swartz &
Kenneth L. Palmer
their Attorneys

United States Patent Office 3,511,669
Patented May 12, 1970

3,511,669
METHOD OF MAKING A SAUSAGE PRODUCT
William E. Swartz, McKeesport, and Kenneth L. Palmer, Mount Lebanon Township, Allegheny County, Pa., assignors, by mesne assignments, to Calgon Corporation, a corporation of Delaware
Filed July 27, 1966, Ser. No. 568,277
Int. Cl. A22c 11/00
U.S. Cl. 99—109                                            3 Claims

ABSTRACT OF THE DISCLOSURE

A sausage product and method of producing the same are provided having an elongated cooked solidified meat mass of alternate discrete side-by-side segments of meat of different appearance. The method comprises stuffing a casing with alternate side-by-side slugs of different colored meat emulsions and thereafter heat processing the stuffed casing.

---

This invention relates to sausage products and methods of making the same and particularly to a sausage product having alternate discrete sections of different meats which may be of different colors to provide a banded effect as for example cured pork and poultry.

The meat processing industry and the poultry processing industry particularly have long sought means for more effectively merchandising meats and poultry. In general processed poultry has been far less widely accepted than meats, and poultry products other than prime cuts have found little acceptance on the market. We have discovered a product and method of producing it which has great sales appeal, is highly attractive and may be made by combining several different meats.

In a preferred form of our invention we provide preferably an elongated casing having alternate discrete segments of meats of different appearance stuffed therein, said meats having been processed to form a unitary solidified mass having alternate bands of different appearance. Preferably we stuff an elongated casing with alternate slugs of meat of different appearance and thereafter heat treating said mass to effect solidification of the same into a unitary mass. For example, we may stuff a casing with alternate discrete slugs of cured meat emulsion such as cured beef or pork as is normally used in making weiners and an emulsion of poultry. The filled casings are thereafter heat processed as in the case of conventional sausage products such as weiners. The resulting product has the appearance of alternate dark and light rings.

In the foregoing general description of our invention we have set out certain objects, purposes and advantages of our invention. Other objects, purposes and advantages of our invention will be apparent from the following description and the accompanying drawings in which FIG. 1 is an isometric view of a sausage according to our invention;

FIG. 2 is a flow sheet of a method of making the sausage of FIG. 1;

FIG. 3 is an isometric view of a second embodiment of sausage according to our invention; and FIG. 4 is an isometric view of a third embodiment of sausage according to our invention.

Referring to FIG. 1 we have illustrated a sausage having alternate sections of cured pork meat emulsion 10 and of poultry meat emulsion 11 in an elongated cylindrical shape such as a conventional weiner. The sausage may be in natural casing, edible synthetic casing or non-edible casing or so-called "skinless." In general, any standard casing or mold process may be used to hold the product during the heat processing stage. The alternate sections of cured pork meat and of poultry meat provide light and dark rings which provide a unique appearance to the product.

In FIG. 3 we have illustrated a second embodiment of our invention having alternate longitudinal strips of cured meat emulsion 21 and poultry meat emulsion 22 in an elongated cylindrical shape such as a conventional weiner.

In FIG. 4 we have illustrated a third embodiment of our invention having alternate spiral strips of cured meat emulsion 31 and poultry meat emulsion 32 in an elongated cylindrical shape such as a conventional weiner.

In the embodiments of FIGS. 3 and 4 as in FIG. 1 the sausage may be in natural casing, synthetic edible casing or so-called "skinless" and any standard casing or mold process may be used to hold the product during heat processing.

In the method of our invention we form an emulsion of cured pork meat and a separate emulsion of poultry meat. We then stuff alternate small slugs of cured pork meat and then poultry into a casing, one after another forming alternate short cylinders of each within the casing. The stuffed casing is then heat processed as in the normal sausage process to cause the emulsions to coagulate or set into a solid integral mass.

In the foregoing specification we have set out certain preferred embodiments and practices of our invention, however, it will be understood that this invention may be otherwise embodied within the scope of the following claims.

We claim:

1. A method of forming a sausage product comprising the steps of forming two separate meat emulsions of different appearance, stuffing alternate side-by-side cylinders of said separate emulsions into a single elongated casing, and thereafter heat processing said stuffed casing and meat mass.

2. A method as claimed in claim 1 wherein the alternate segments are discrete cylinders of cured meat and poultry meat.

3. The method of making sausage comprising the steps of
    (a) forming at least two sausage emulsions of different physical characteristics, and
    (b) stuffing said two emulsions in alternate cylindrical slugs one after the other in timed sequence into a sausage casing to form side-by-side cylinders of different character in a single casing.

References Cited

UNITED STATES PATENTS

| | | |
|---|---|---|
| 1,107,184 | 8/1914 | Priban. |
| 2,210,765 | 8/1940 | Mahlke _____ 99—107 X |
| 2,876,100 | 3/1959 | Rogers et al. _____ 99—107 |
| 1,983,681 | 12/1934 | Seaver _____ 99—109 |

FOREIGN PATENTS

| | | |
|---|---|---|
| 377,256 | 7/1932 | Great Britain. |
| 115,644 | 1/1946 | Sweden. |

HYMAN LORD, Primary Examiner